(12) United States Patent
Zhou et al.

(10) Patent No.: US 8,379,706 B2
(45) Date of Patent: Feb. 19, 2013

(54) SIGNAL AND NOISE POWER ESTIMATION

(75) Inventors: Yan Zhou, San Diego, CA (US); Jibing Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 689 days.

(21) Appl. No.: 12/510,484

(22) Filed: Jul. 28, 2009

(65) Prior Publication Data

US 2011/0026574 A1 Feb. 3, 2011

(51) Int. Cl.
 *H04B 3/46* (2006.01)
(52) U.S. Cl. ........................................ 375/227
(58) Field of Classification Search .................. 375/227, 375/260, 340
See application file for complete search history.

(56) References Cited

U.S. PATENT DOCUMENTS

| | | | |
|---|---|---|---|
| 7,372,911 B1 * | 5/2008 | Lindskog et al. | 375/267 |
| 2006/0040706 A1 * | 2/2006 | Wu et al. | 455/562.1 |
| 2006/0093074 A1 * | 5/2006 | Chang et al. | 375/340 |
| 2006/0172716 A1 * | 8/2006 | Yoshii et al. | 455/226.1 |
| 2007/0071147 A1 * | 3/2007 | Sampath et al. | 375/347 |
| 2007/0127355 A1 * | 6/2007 | Li et al. | 370/201 |
| 2007/0230628 A1 * | 10/2007 | You et al. | 375/340 |

FOREIGN PATENT DOCUMENTS

| EP | 1255369 | 11/2002 |
|---|---|---|
| WO | WO2008004987 A1 | 1/2008 |

OTHER PUBLICATIONS

Dietrich et al ("On performance limits of optimum reduced rank channel estimation" GLOBECOM'02. 2002—I EEE Global Telecommunications Conference. Conference Proceedings. Taipei, Taiwan, Nov. 17-21, 2002; [IEEE Global Telecommunications Conference], New York, NY: IEEE, US LNKDDO1: 10.1109/GLOCOM. 2002.1188098, vol. 1, Nov. 2002, pp. 345-349).*

Dan Sui et al: "A Blind SNR Estimator Based on Iterative Subspace Tracking Algorithm for Digital Modulated Signals", Information Theory Workshop, IEEE, IEEE, Piscataway, NJ, US, Oct. 1, 2006, pp. 616-620, XP031055610.

Deepa Ramakrishna et al: "Subspace-Based SIR Estimation for CDMA Cellular Systems", IEEE Transactions on Vehicular Technology, IEEE Service Center, Piscataway, NJ, US, vol. 49, No. 5, Sep. 1, 2000, XP011064134.

Dietrich F et al: "On performance limits o f optimum reduced rank channel estimation" GLOBECOM'02. 2002—IEEE Global Telecommunications Conference. Conference Proceedings. Taipei, Taiwan, Nov. 17-21, 2002; [IEEE Global Telecommunications Conference], New York, NY : IEEE, US LNKDDO1 : 10.1109/GLOCOM. 2002.1188098, vol. 1, Nov. 17, 2002, pp. 345-349, XP010635970 ISBN: 978-0-7803-7632-8.

International Search Report and Written Opinion—PCT/US2010/043162—International Search Authority, European Patent Office,Jan. 24, 2011.

(Continued)

*Primary Examiner* — Leon-Viet Nguyen
(74) *Attorney, Agent, or Firm* — Larry Moskowitz; Mary A. Fales (57) ABSTRACT

Techniques for estimating desired signal power and noise power of a signal received over a communications channel. In an aspect, a pilot autocorrelation matrix is derived based on certain assumptions about the time delay profile, Doppler profile, and/or spatial correlation of the channel. The pilot autocorrelation matrix is decomposed into a set of eigenvectors. From the eigenvector decomposition, a set of dominant eigenvectors is selected to estimate the signal power, while a set of non-dominant eigenvectors is selected to estimate the noise power. The techniques may readily be applied to arbitrary pilot patterns and to a wide array of SNR ranges and channel conditions.

6 Claims, 6 Drawing Sheets

OTHER PUBLICATIONS

Lindskog E et al: "Reduced rank channel estimation", Vehicular Technology Conference, 1999 IEEE 49th Houston, TX, USA May 16-20, 1999, Piscataway, NJ, USA,IEEE, US, vol. 2, May 16, 1999, pp. 1126-1130, XP010342181.

Strobach P: "Fast recursive orthogonal iteration subspace tracking algorithms and applications", Signal Processing, Elsevier Science Publishers B.V. Amsterdam, NL, vol. 59, No. 1, May 1, 1997, pp. 73-100, XP004075304, ISSN: 0165-1684.

* cited by examiner

SIGNAL AND NOISE POWER ESTIMATION

TECHNICAL FIELD

The present invention relates generally to communications, and more specifically, to techniques for estimating the signal and noise power received over a communications channel.

BACKGROUND

Wireless communications systems are widely deployed to provide various types of communication such as voice, packet data, and so on. These systems may be based on code division multiple access (CDMA), time division multiple access (TDMA), orthogonal frequency division multiple access (OFDMA), or other multiple access techniques to allow multiple devices to share a common communications medium. Such systems can conform to standards such as Third-Generation Partnership Project 2 (3gpp2, or "cdma2000"), Third-Generation Partnership (3gpp, or "W-CDMA"), or Long Term Evolution ("LTE" or "LTE-A").

In such communications systems, it is often useful to estimate the quality of a communications channel, e.g., to obtain estimates of signal-to-noise ratio (SNR) and/or signal and noise power received over a channel. Such signal and noise power estimates are often computed from received pilots, or signals having known content, transmitted over the communications channel according to pilot patterns defined by a standard.

It would be desirable to provide techniques for estimating the signal and noise power received over a communications channel applicable to arbitrary pilot patterns. It would be further desirable to ensure accurate estimation of such signal and noise power over commonly expected SNR ranges and channel conditions.

SUMMARY

An aspect of the present disclosure provides an apparatus for estimating the characteristics of a signal received over a communications channel, the apparatus comprising: a memory storing a signal basis and a noise basis, the signal basis formed from selecting at least one dominant eigenvector from an eigenvector basis for an autocorrelation matrix of a channel response vector, the noise basis formed from selecting at least one non-dominant eigenvector from the eigenvector basis; a signal projecting module configured to project the received signal onto the signal basis to estimate the signal power; and a noise projecting module configured to project the received signal onto the noise basis to generate a noise vector to estimate the noise power.

Another aspect of the present disclosure provides a method for estimating the characteristics of a signal received over a communications channel, the method comprising: computing an eigenvector basis for an autocorrelation matrix of a channel response vector; selecting at least one dominant eigenvector from the eigenvector basis to form a signal basis; projecting the received signal onto the signal basis to generate a signal vector; and computing an energy of the signal vector to estimate the signal power.

Yet another aspect of the present disclosure provides an apparatus for estimating the characteristics of a signal received over a communications channel, the apparatus comprising: a memory storing a signal basis, the signal basis formed from selecting at least one dominant eigenvector from an eigenvector basis for an autocorrelation matrix of a channel response vector; a projecting module configured to project the received signal onto the signal basis to generate a signal vector; and an energy computation module configured to compute an energy of the signal vector to estimate the signal power.

Yet another aspect of the present disclosure provides an apparatus for estimating the characteristics of a signal received over a communications channel, the apparatus comprising: means for generating a signal basis and a noise basis from an autocorrelation matrix of a channel response vector; means for projecting the received signal onto the signal basis to calculate a signal power; and means for projecting the received signal onto the noise basis to calculate a noise power.

Yet another aspect of the present disclosure provides computer program product storing code for causing a computer to estimate the characteristics of a signal received over a communications channel, the code comprising: code for causing a computer to generate a signal basis and a noise basis from an autocorrelation matrix of a channel response vector; code for causing a computer to project the received signal onto the signal basis to calculate a signal power; and code for causing a computer to project the received signal onto the noise basis to calculate a noise power.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Figure 1:
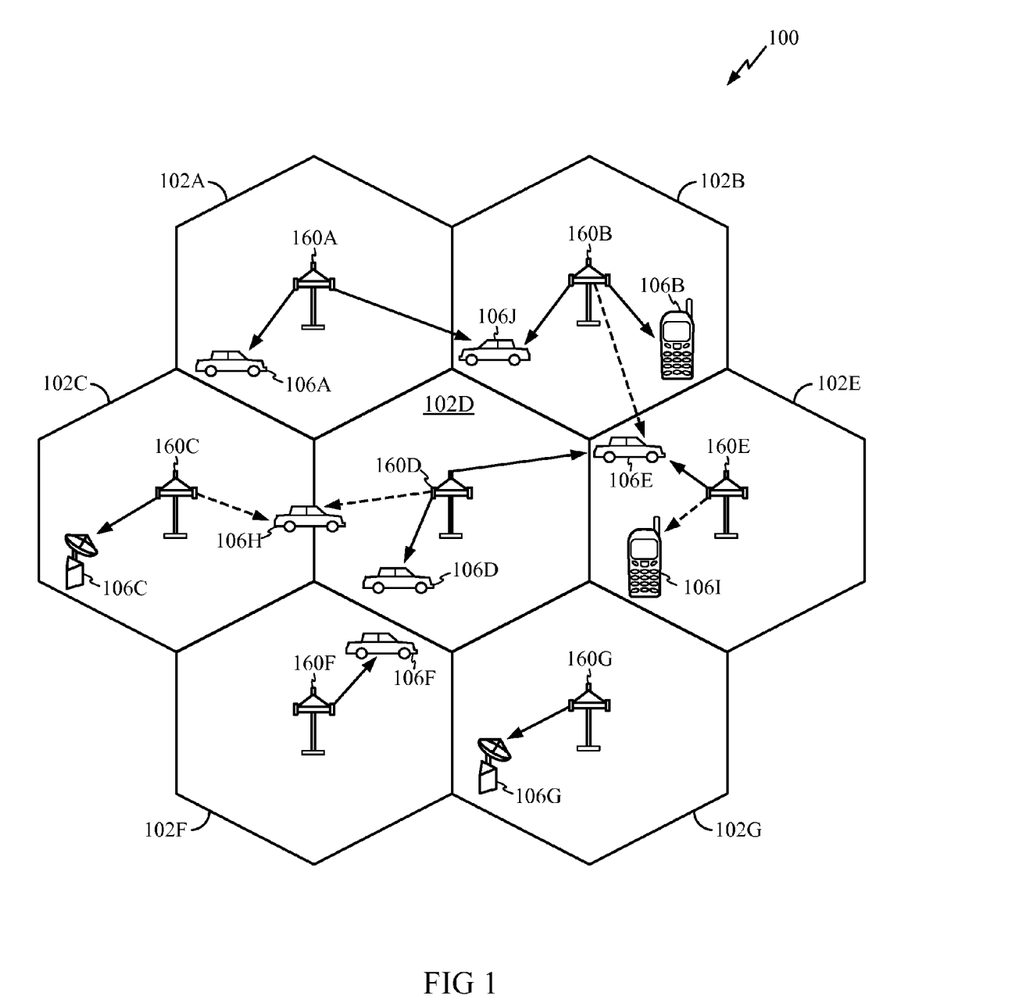
FIG. 1 illustrates a prior art wireless cellular communications system.

Referring to FIG. 1, in a wireless cellular communications system 100, reference numerals 102A to 102G refer to cells, reference numerals 160A to 160G refer to base stations, and reference numerals 106A to 106G refer to access terminals (AT's). A communications channel includes a forward link (FL) (also known as a downlink) for transmissions from a base station 160 to an access terminal (AT) 106 and a reverse link (RL) (also known as an uplink) for transmissions from an AT 106 to a base station 160. The AT 106 is also known as a remote station, a mobile station or a subscriber station. The access terminal (AT) 106 may be mobile or stationary. Each link may incorporate a different number of carrier frequencies. Furthermore, an access terminal 106 may be any data device that communicates through a wireless channel or through a wired channel, for example using fiber optic or coaxial cables. An access terminal 106 may further be any of a number of types of devices including but not limited to PC card, compact flash, external or internal modem, or wireless or wireline phone.

Modern communications systems are designed to allow multiple users to access a common communications medium. Numerous multiple-access techniques are known in the art, such as time division multiple-access (TDMA), frequency division multiple-access (FDMA), space division multiple-access (SDMA), polarization division multiple-access, code division multiple-access (CDMA), orthogonal frequency division multiple access (OFDMA), and other similar multiple-access techniques. The multiple-access concept is a channel allocation methodology which allows multiple user access to a common communications link. The channel allocations can take on various forms depending on the specific multiple-access technique. For example, in FDMA systems, the total frequency spectrum is divided into a number of smaller sub-bands and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a code.

In a communications system, information may be transmitted using any of numerous modulation techniques known in the art, including quadrature phase-shift keying (QPSK), quadrature amplitude modulation (QAM), etc. In a modulation technique known as orthogonal frequency division multiplexing (OFDM), data is modulated onto multiple orthogonal sub-carriers using a conventional modulation scheme, and recovered at the receiver on the basis of the orthogonality of the sub-carriers.

While certain exemplary embodiments of the present disclosure may be described hereinbelow in the context of OFDM, one of ordinary skill in the art will appreciate that the techniques may readily be applied to other digital communications systems, such as those based on other modulation techniques. Such alternative exemplary embodiments are contemplated to be within the scope of the present disclosure.

Figure 2:
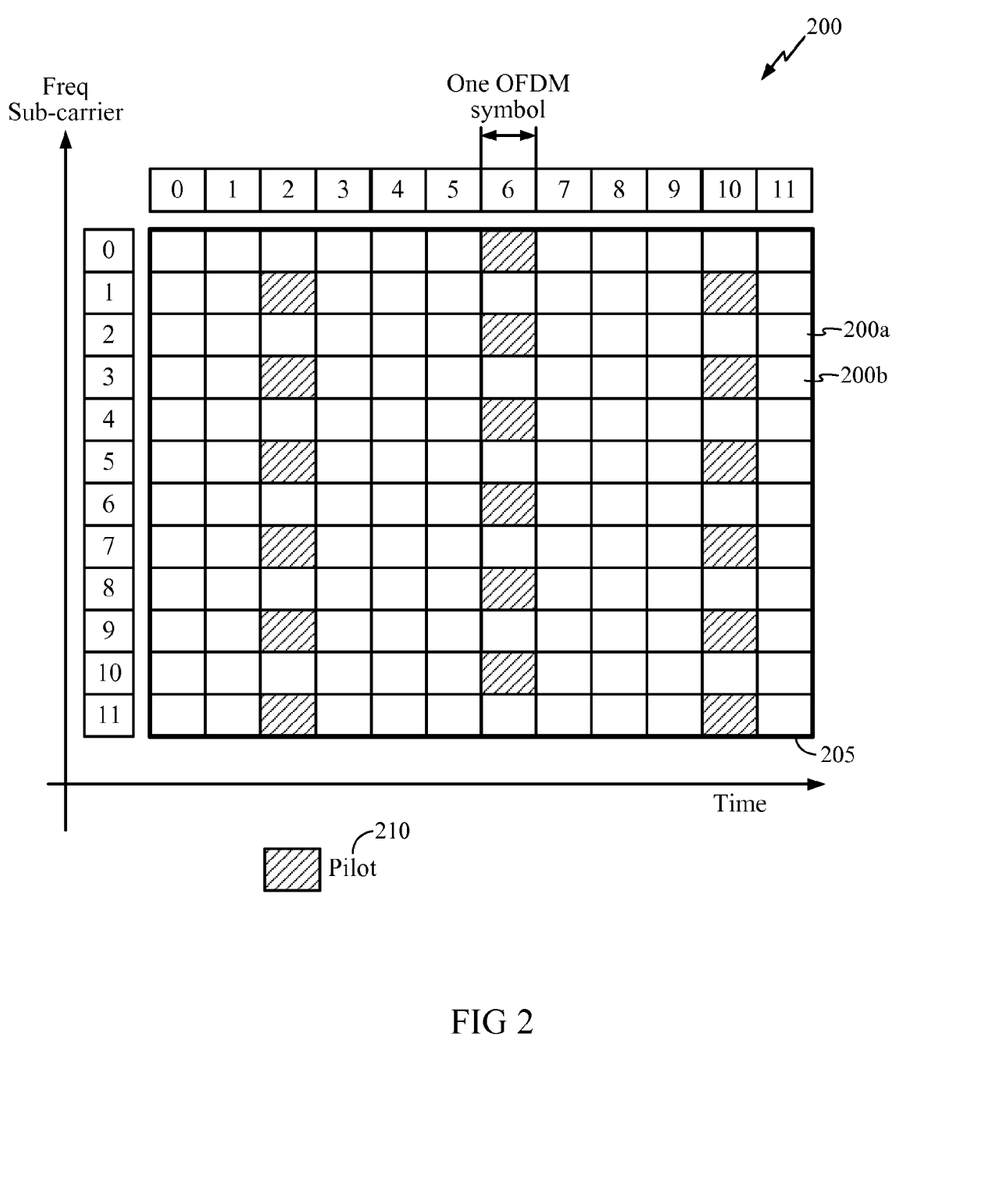
FIG. 2 illustrates an exemplary pilot grid pattern for a communications scheme based on OFDM.

FIG. 2 illustrates an exemplary time-frequency grid pattern 200 for a communications scheme based on OFDM. Note the grid pattern 200 is shown for illustrative purposes only, and is not meant to restrict the scope of the present disclosure to any particular grid pattern shown.

In FIG. 2, the horizontal time axis is divided in units of OFDM symbols, while the vertical frequency axis is divided amongst a plurality of orthogonal sub-carriers. An intersection between an OFDM symbol and an OFDM sub-carrier is designated as a "grid block," e.g., grid blocks 200a and 200b. In an exemplary embodiment, an OFDM symbol may span, e.g., 100 µsec, while OFDM sub-carriers may be separated from each other by a minimum spacing of, e.g., 10 kHz.

According to the present disclosure, an "assignment block" may include a block of $N_t$ OFDM symbols and $N_f$ sub-carriers. For example, 12 OFDM symbols and 12 sub-carriers are shown in an exemplary assignment block 205 in FIG. 2.

An assignment block may be characterized by an $N_f \times N_t$ channel matrix H, wherein each element H(a,b) of the matrix H represents the channel coefficient corresponding to the a-th sub-carrier in the b-th OFDM symbol. For convenience, the matrix H can also be rewritten as an $N_f N_t \times 1$ channel vector h as follows (Equation 1):

$$\underline{h} = \begin{bmatrix} \underline{H}(1:N_f, 1) \\ \vdots \\ \underline{H}(1:N_f, Nt) \end{bmatrix}.$$

In FIG. 2, certain of the grid blocks, i.e., the diagonally hatched grid blocks 210, are designated as pilots. The pilots may correspond to grid blocks wherein pre-defined patterns known to the receiver are sent by the transmitter, e.g., to aid in channel estimation by the receiver. For the $N_p$ pilots of an assignment block (e.g., $N_p$=18 for assignment block 205), an $N_p \times 1$ pilot channel vector $h_p$ can be formed by extracting the channel coefficients at the pilot positions from h by an $N_p \times N_f N_t$ pilot selection matrix P as follows (Equation 2):

$$h_p = Ph.$$

It will be appreciated that the pilot selection matrix P will depend on the specific pilot pattern used in the communication system (e.g., a specific pilot pattern such as shown in FIG. 2 for assignment block 205), and thus, by appropriately selecting P, arbitrary pilot patterns may be accommodated in the signal and noise estimation techniques to be described hereinbelow.

One of ordinary skill in the art will appreciate that the pilots may enable the receiver to, e.g., estimate the characteristics of the communications channel. In certain receiver implementations, e.g., those utilizing a minimum mean-squared error (MMSE) channel estimator, a spatial equalizer, or a log-likelihood ratio (LLR) estimator, it may be useful to estimate the average signal-to-noise ratio (SNR) of the communications channel using the received pilots. It would be desirable to provide techniques for estimating the SNR and/or signal and noise power that are applicable to arbitrary pilot patterns in time and frequency, and that also have good accuracy across commonly expected SNR ranges and channel conditions. Discussed further hereinbelow are eigenvector decomposition-based techniques for estimating the signal and noise power of a received signal.

Based on the assumptions above, an autocorrelation matrix $R_{pp}$, for the pilots may be derived as follows (Equation 3):

$$R_{pp} = E[h_p h_p^H]; \quad \text{(Eq. 3a)}$$
$$= E[\underline{P}h h^H \underline{P}^H]; \quad \text{(Eq. 3b)}$$
$$= \underline{P} \cdot E[\underline{h}\underline{h}^H] \cdot \underline{P}^H; \quad \text{(Eq. 3c)}$$
$$= \underline{P} R_{hh} \underline{P}^H; \quad \text{(Eq. 3d)}$$

wherein $R_{hh}$ represents the autocorrelation matrix associated with h.

In an aspect of the present disclosure, to compute the autocorrelation matrix $R_{hh}$, certain assumptions may be made, e.g., regarding the time delay and Doppler profiles of the communications channel.

Figure 3A:
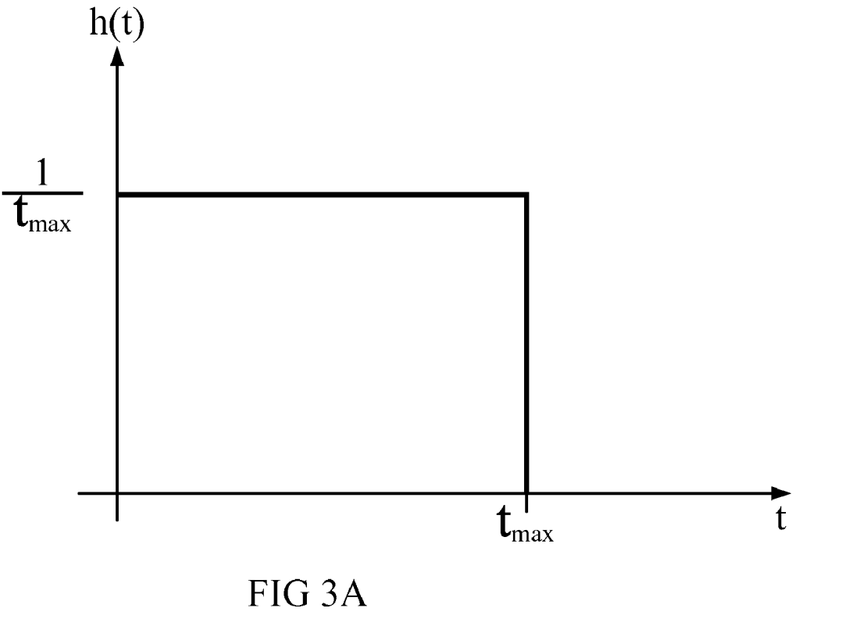
FIG. 3A illustrates an exemplary embodiment of an assumed time delay profile of the channel that may be used in the computation of $R_{hh}$.

FIG. 3A illustrates an exemplary embodiment of an assumed time delay profile of the channel that may be used in the computation of $R_{hh}$. In FIG. 3A, the time impulse response h(t) of the channel is assumed to be rectangular up to a time $t_{max}$, as shown. In an exemplary embodiment, $t_{max}$ may be, e.g., 4 μsecs. It will be appreciated that the assumed time delay profile in FIG. 3A is given for illustrative purposes only, and is not meant to limit the scope of the present disclosure to any particular assumed time delay profile for the channel. In alternative exemplary embodiments, alternative values of $t_{max}$, and/or time delay profiles having shapes other than strictly rectangular, may be used. Such alternative exemplary embodiments are contemplated to be within the scope of the present disclosure.

Figure 3B:
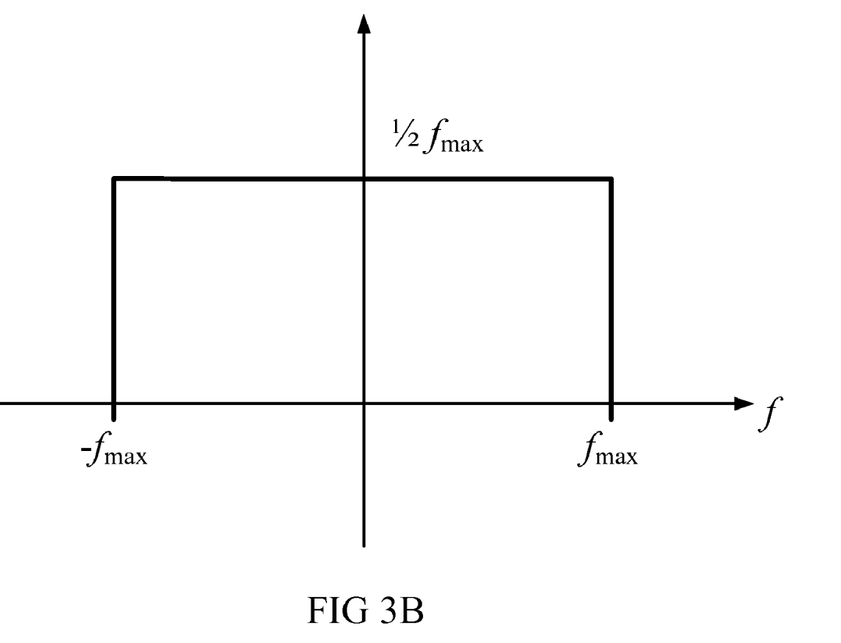
FIG. 3B illustrates an exemplary embodiment of an assumed Doppler profile of the channel that may be used in the computation of $R_{hh}$.

FIG. 3B illustrates an exemplary embodiment of an assumed Doppler profile of the channel that may be used in the computation of $R_{hh}$. In FIG. 3B, the Doppler profile of the channel is assumed to be rectangular from a frequency $-f_{max}$ to a frequency $+f_{max}$, as shown. In an exemplary embodiment, $f_{max}$ may be derived based on an assumption of speed 120 kmph. It will be appreciated that the assumed Doppler profile in FIG. 3B is given for illustrative purposes only, and is not meant to limit the scope of the present disclosure to any particular assumed Doppler profile for the channel. In alternative exemplary embodiments, alternative values of $f_{max}$, and/or Doppler profiles having shapes other than strictly rectangular, and/or symmetric about zero frequency, may be used. Such alternative exemplary embodiments are contemplated to be within the scope of the present disclosure.

One of ordinary skill in the art will appreciate that the assumed time delay and Doppler profiles may be used to compute the values of every entry in the autocorrelation matrix $R_{hh}$, and thus, through Equation 3, the pilot correlation matrix $R_{pp}$ may be derived.

According to the present disclosure, the computed pilot correlation matrix $R_{pp}$, may further be used to derive signal and noise power estimates for the channel. In particular, construct the eigenvector decomposition of $R_{pp}$, as follows (Equation 4):

$$R_{pp} = U \Lambda U^H;$$

wherein $\Lambda$ is an $N_p \times N_p$ diagonal matrix with the eigenvalues arranged in descending order from the top-left corner of $\Lambda$ to the bottom-right corner, and U is the corresponding $N_p \times N_p$ matrix of eigenvectors. From amongst the eigenvectors in U, a set of $N_{dom}$ "dominant" eigenvectors may be identified. In an exemplary embodiment, the dominant eigenvectors are those having corresponding eigenvalues greater than a constant times the mean of all eigenvalues in $\Lambda$, and the number $N_{dom}$ may correspond to the number of such identified dominant eigenvectors. In an exemplary embodiment, the value of the constant may be, e.g., $10^{-4}$. The eigenvectors not identified as dominant may be accordingly identified as non-dominant.

One of ordinary skill in the art will appreciate that various alternative criteria may be used to identify the "dominant" eigenvectors associated with $R_{pp}$, e.g., by comparing the eigenvalues in $\Lambda$ to a function of the eigenvalues other than the mean (e.g., the median), or by comparing the eigenvalues in $\Lambda$ to a constant value not dependent on the eigenvalues. Such alternative exemplary embodiments are contemplated to be within the scope of the present disclosure.

Based on the identification of dominant and non-dominant eigenvectors, the eigenvector matrix U may be partitioned as follows (Equation 5):

$$U = [U_p \vdots U_n];$$

wherein $U_p$ is a matrix containing the $N_{dom}$ dominant eigenvectors of U, while $U_n$ is a matrix containing the $(N_p - N_{dom})$ non-dominant eigenvectors. Assume the pilot signals received at the receiver form an $N_p \times 1$ received pilot vector z expressed as follows (Equation 6):

$$z = Sh_p + n;$$

wherein S is denoted the "transmit pilot matrix," and is an $N_p \times N_p$ diagonal matrix containing the pilot signals originally sent by the transmitter in the diagonal entries. n is a noise vector whose entries may be assumed to have equal variance $\sigma^2$.

In the discussion below, it is assumed that the pilot signals are fixed in each assignment block and have equal power normalized to 1, e.g. $S S^H = S^H S = I$, with I as the identity matrix. In that case, it can be shown that the vectors making up the matrix product S U also span an eigenbasis for the autocorrelation matrix of z. One of ordinary skill in the art may readily derive alternative formulations of the techniques herein when the transmit pilot matrix S does not have such properties, e.g., if the pilot signals in S do not have equal power, and such alternative exemplary embodiments are contemplated to be within the scope of the present disclosure.

In an exemplary embodiment of the present disclosure, the received pilot vector z may then be projected onto a matrix S $U_p$, the column vectors of which span a "full signal basis," to obtain a signal vector x as follows (Equation 7):

$$x = U_p^H S^H z.$$

The signal vector x may then be used to estimate the signal power $\hat{\rho}$ as follows (Equation 8):

$$\hat{\rho} = x^H x / N_p.$$

In an alternative exemplary embodiment, the received signal vector z may be projected onto an $N_p \times K_s$ sub-matrix $S\tilde{U}_p$ of the matrix $SU_p$ P to obtain an alternative signal vector $\tilde{x}$, e.g., (Equation 9):

$$\tilde{x} = \tilde{U}_p^H S^H z.$$

The column vectors of the sub-matrix $S\tilde{U}_p$ may be understood to span a "signal basis." The signal power $\hat{\rho}$ may then be computed as follows (Equation 10):

$$\hat{\rho} = \tilde{x}^H \tilde{x} / N_p.$$

In an exemplary embodiment, $\tilde{U}_p = U_p(:, 1:K_s)$, wherein $1 \leq K_s \leq N_{dom}$. In this exemplary embodiment, $\tilde{U}_p$ may be understood as being a matrix that includes only the eigenvectors corresponding to the $K_s$ largest eigenvalues. In an exemplary embodiment, $K_s$ may be, e.g., 1, so that $\tilde{U}_p$ includes only the eigenvector corresponding to the largest eigenvalue in $\Lambda$. It will be noted that using the single largest eigenvector to compute the signal power may advantageously improve the accuracy of the signal power estimation in low-SNR channel conditions, while yielding insignificant performance loss in high-SNR channel conditions.

In an exemplary embodiment, successive values of $\hat{\rho}$ obtained for a plurality $N_{tile}$ of "OFDM tiles" or assignment blocks may be averaged together to further refine the estimate of $\hat{\rho}$, e.g., (Equation 11):

$$\hat{\rho} = \frac{\sum_{i=1}^{N_{tile}} \hat{\rho}_i}{N_{tile}};$$

wherein $\hat{\rho}_i$ is the signal power estimate $\hat{\rho}$ corresponding to each tile i of a plurality of OFDM tiles.

In alternative exemplary embodiments, other averaging schemes, such as a recursive weighting scheme, may be adopted to combine the signal power estimates obtained from a plurality of OFDM tiles. Such alternative exemplary embodiments are contemplated to be within the scope of the present disclosure.

In an exemplary embodiment of the present disclosure, the received signal vector z may further be projected onto a matrix $S\,U_n$, the column vectors of which span a "full noise basis," to obtain a noise vector y as follows (Equation 12):

$$y = U_n^H S^H z.$$

The noise vector y may then be used to estimate the noise power $\hat{\tau}^2$ as follows (Equation 13):

$$\hat{\tau}^2 = y^H y / (N_p - N_{dom}).$$

In an alternative exemplary embodiment, the received signal vector z may be projected onto an $N_p \times K_n$ sub-matrix $S\tilde{U}_n$ of the eigenvectors in the full noise basis $S\,U_n$ to generate an alternative noise vector $\tilde{y}$, e.g., (Equations 14 and 15):

$$\tilde{y} = \tilde{U}_n^H S^H z; \quad \text{(Eq. 14)}$$

$$\hat{\tau}^2 = \tilde{y}^H \tilde{y} / (N_p - K_n + 1) \quad \text{(Eq. 15)}$$

The column vectors of the matrix $S\tilde{U}_n$ may be understood to span a "noise basis." In an exemplary embodiment, $\tilde{U}_n = U(:, K_n:N_p)$, and $N_{dom}+1 \leq K_n \leq N_p$, and $\tilde{U}_n$ may be understood as being a matrix that includes only the eigenvectors corresponding to the $K_n$ largest of the non-dominant eigenvectors.

It will be appreciated that the specific dimensions (e.g., $N_t$ and $N_f$) of the assignment block used for the computations described hereinabove may be appropriately chosen based on the receiver design. For example, a smaller assignment block may be adopted to simplify the computations involved. Note that while an assignment block is illustrated in FIG. 2 as including contiguous OFDM symbols and sub-carriers, it will be appreciated that the symbols and sub-carriers of an assignment block need not be contiguous. The techniques of the present disclosure may readily be applied to assignment blocks having arbitrary size and shape.

While exemplary embodiments of the present disclosure have been illustrated for the case of a single transmit antenna and a single receive antenna, one of ordinary skill in the art will appreciate that the techniques may readily be modified to accommodate more than one transmit and/or receive antenna, e.g., a multiple-input multiple-output (MIMO) system. For example, an OFDM system employing K transmit antennas and M receive antennas may be accommodated according to the techniques of the present disclosure, wherein the K transmit antennas can simultaneously transmit K data symbols corresponding to K spatial layers at each data symbol position, while one of the K transmit antennas may transmit pilot symbols at any pilot position.

Figure 4:
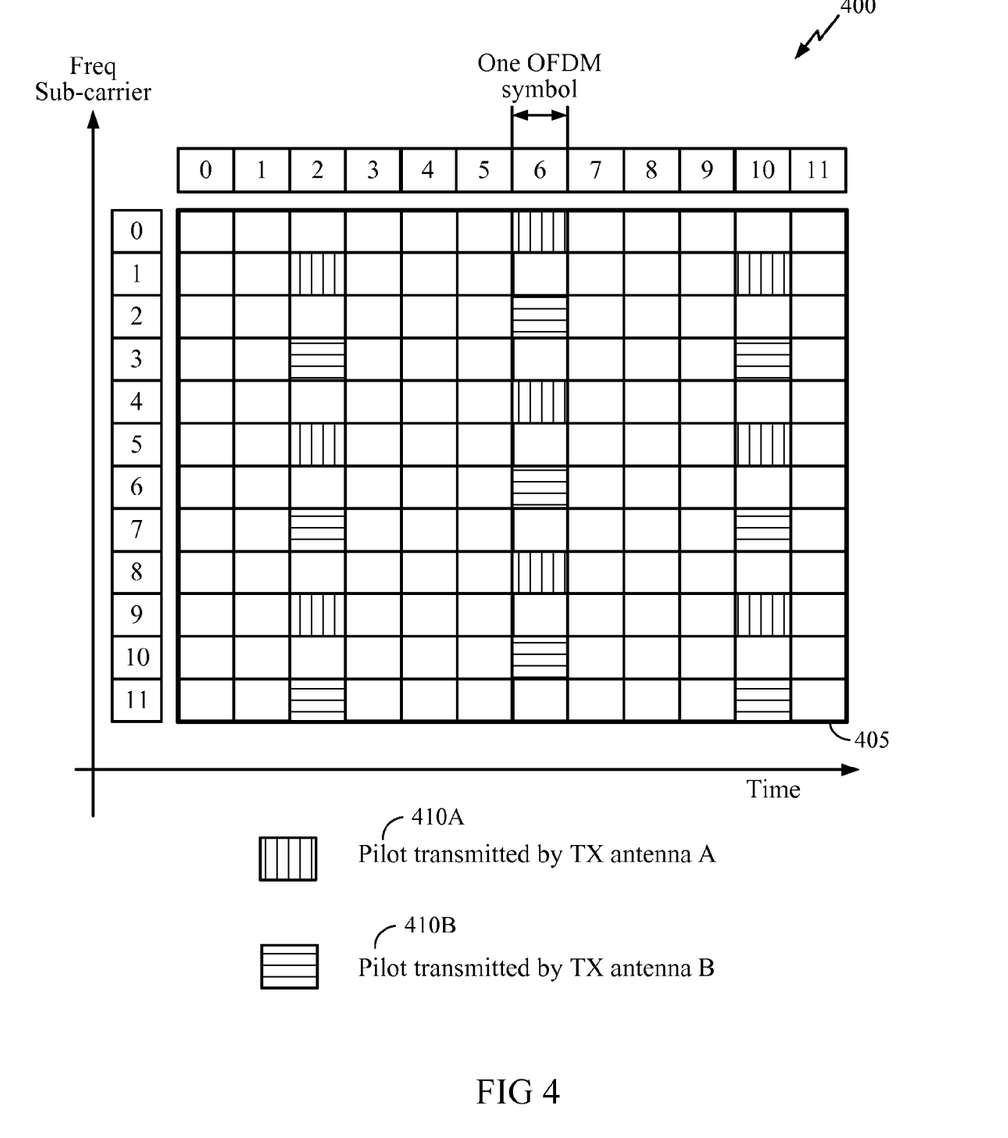
FIG. 4 illustrates an exemplary time-frequency grid pattern for an OFDM-based system employing K=2 transmit antennas and an unspecified number M of receive antennas.

FIG. 4 illustrates an exemplary time-frequency grid pattern 400 for an OFDM-based system employing K=2 transmit antennas and an unspecified number M of receive antennas. In FIG. 4, a first transmit antenna A transmits a pilot signal in the vertically hatched grid blocks 410A, while a second transmit antenna B transmits a pilot signal in the horizontally hatched grid blocks 410B. The non-hatched grid blocks may correspond to the superposition of data symbols from all layers.

For the assignment block 405 in FIG. 4, the channel response vector h may be constructed as follows (Equation 16):

$$\underline{h} = \begin{bmatrix} \underline{h}^1 \\ \vdots \\ \underline{h}^M \end{bmatrix}; \quad \text{(Eq. 16a)}$$

$$\underline{h}^m = \begin{bmatrix} \underline{h}^{(m,1)} \\ \vdots \\ \underline{h}^{(m,K)} \end{bmatrix}; \quad \text{(Eq. 16b)}$$

$$\underline{h}^{(m,k)} = \begin{bmatrix} H^{(m,k)}(1:N_f, 1) \\ \vdots \\ H^{(m,k)}(1:N_f, N_t) \end{bmatrix}; \quad \text{(Eq. 16c)}$$

wherein a superscript such as (m, k) denotes a specific instance of a variable corresponding to the m-th receive antenna and k-th transmit antenna. From the expression for h given in Equation 16, one of ordinary skill in the art may readily derive the pilot autocorrelation matrix $R_{pp}$, as described earlier herein, again by making certain assumptions regarding the time delay and Doppler profiles of the communications channel, as well as further assumptions regarding the spatial channel correlation. From the pilot autocorrelation matrix $R_{pp}$, eigenvector decomposition may be performed as previously described to compute signal and noise power estimates for the communications channel composed of the K transmit antennas and M receive antennas. Such exemplary embodiments are contemplated to be within the scope of the present disclosure.

Figure 5:
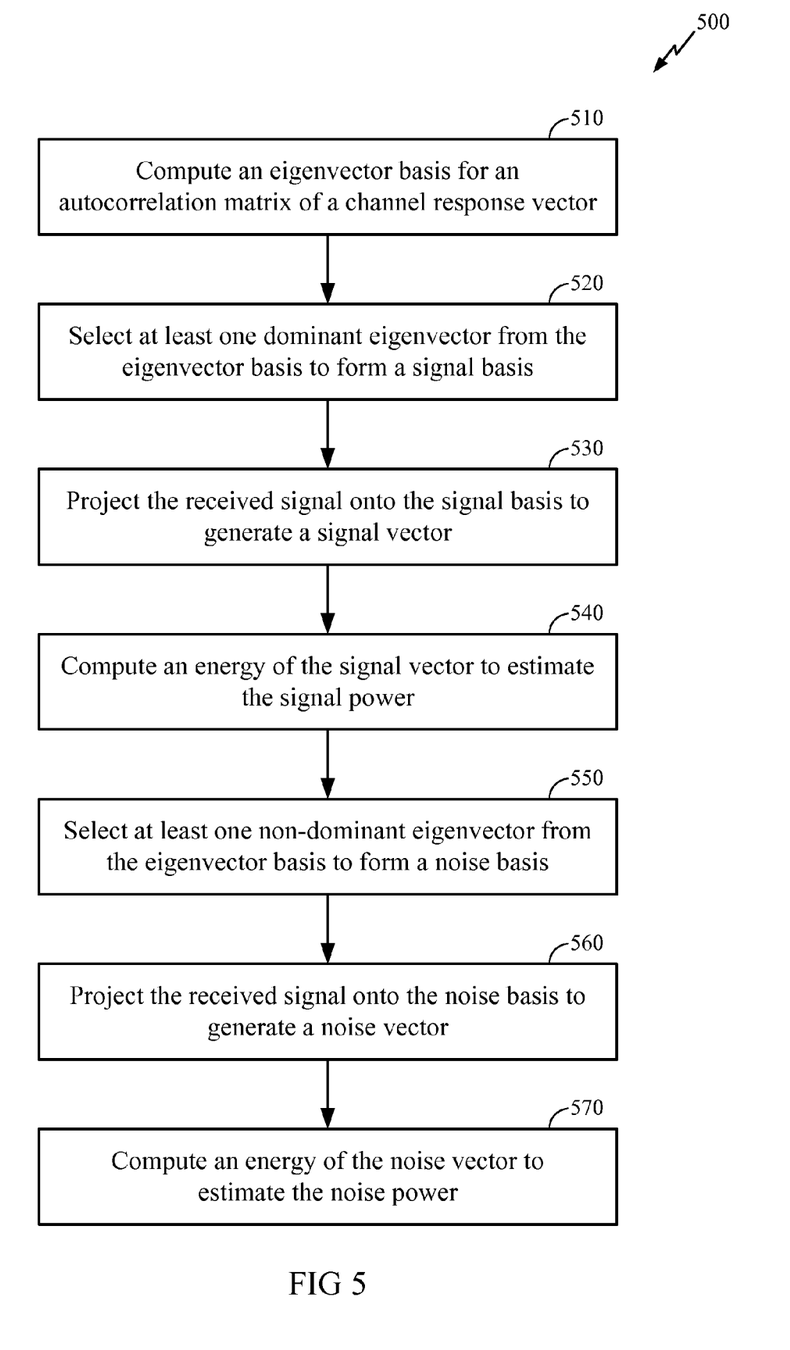
FIG. 5 illustrates an exemplary embodiment of a method according to the present disclosure.

FIG. 5 illustrates an exemplary embodiment 500 of a method according to the present disclosure. Note the method of FIG. 5 is provided for illustrative purposes only, and is not meant to limit the scope of the present disclosure to any particular exemplary embodiment of a method.

In FIG. 5, at step 510, an eigenvector basis for an autocorrelation matrix of a channel response vector is computed.

At step 520, at least one dominant eigenvector from the eigenvector basis is selected to form a signal basis.

At step 530, the received signal is projected onto the signal basis to generate a signal vector.

At step 540, an energy of the signal vector is computed to estimate the signal power.

At step 550, at least one non-dominant eigenvector is selected from the eigenvector basis to form a noise basis.

At step 560, the received signal is projected onto the noise basis to generate a noise vector.

At step 570, an energy of the noise vector is computed to estimate the noise power.

In an exemplary embodiment, the operations at steps 510, 520, and 550 may be performed "off-line." For example, the vectors constituting the signal and noise bases may be derived using computer simulation and/or computation software separate from a receiver, and stored in a memory of a receiver. Subsequently, when the receiver is receiving signals over a communications channel, the vectors constituting the signal and noise bases may be read from memory, and the subsequent calculations of signal power at steps 530-540 and of noise power at steps 560-570 may be performed using a processor at the receiver. These and other exemplary embodiments not explicitly described herein are contemplated to be within the scope of the present disclosure.

Figure 6:
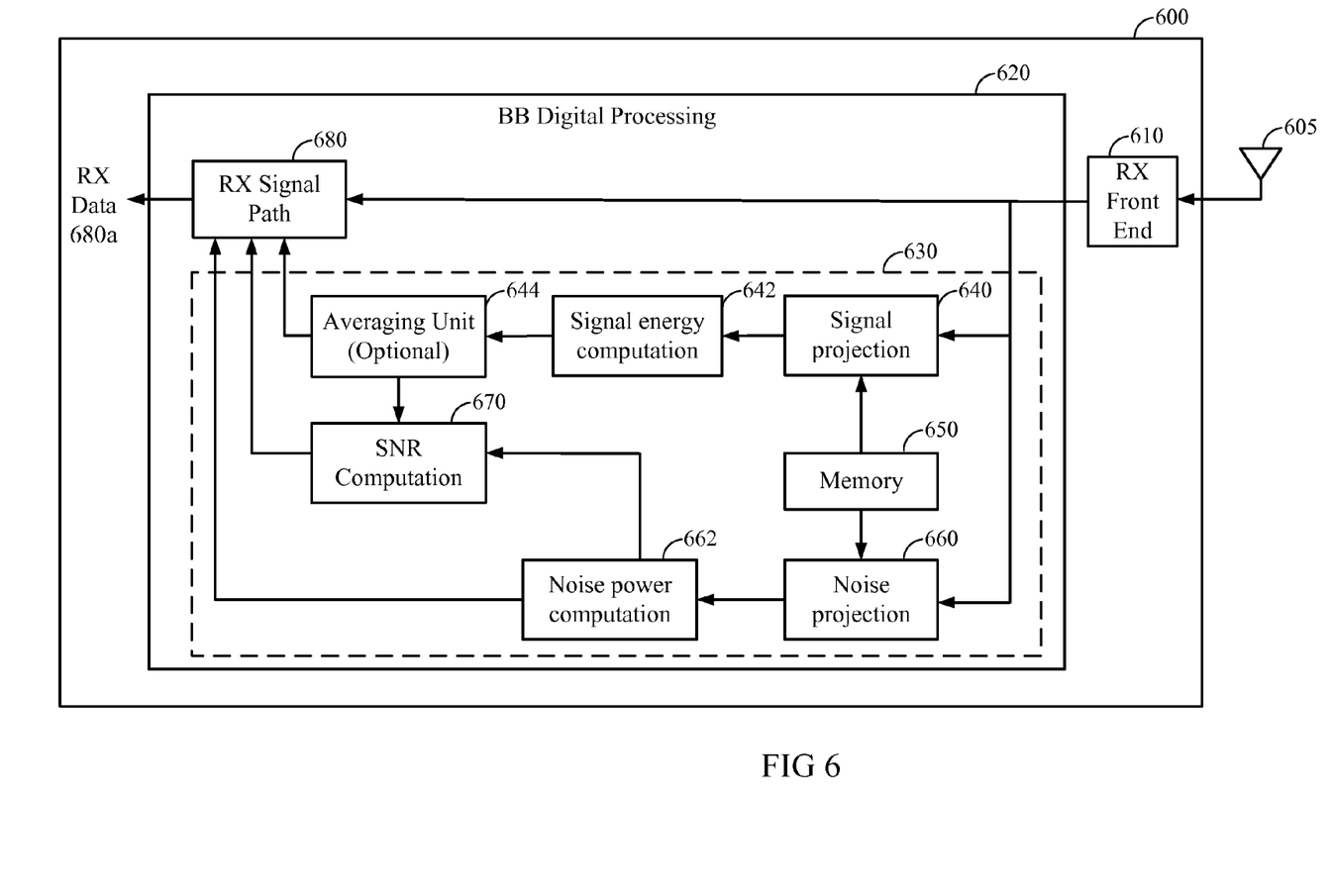
FIG. 6 illustrates an exemplary embodiment of a receiver according to the present disclosure.

FIG. 6 illustrates an exemplary embodiment of a receiver 600 according to the present disclosure. Note the receiver 600 is provided for illustrative purposes only, and is not meant to limit the scope of the present disclosure. One of ordinary skill in the art will appreciate that the receiver 600 may be implemented in any communications receiver, e.g., a receiver for base stations such as 160A to 160G in FIG. 1, or for access terminals such as 106A to 106G in FIG. 1. Such exemplary embodiments are contemplated to be within the scope of the present disclosure.

In FIG. 6, the receiver 600 contains a signal and/or noise power estimation block 630 residing in a baseband digital processing module 620, wherein the block 630 is configured for estimating the characteristics of a signal received over a communications channel. The block 630 includes a memory 650 storing a signal basis, the signal basis comprising at least one dominant eigenvector selected from an eigenvector basis for an autocorrelation matrix of a channel response vector. A projecting module 640 is configured to project the received signal onto the signal basis to generate a signal vector, and a signal energy computation module 642 is configured to compute an energy of the signal vector to estimate the signal power. An averaging unit 644 is optionally provided to combine the estimated signal power from a first OFDM tile with the estimated signal power from a second OFDM tile to refine the estimated signal power.

The memory 650 may further store a noise basis, the noise basis comprising at least one non-dominant eigenvector from the eigenvector basis. A projecting module 660 is configured to project the received signal onto the noise basis to generate a noise vector, and a noise power computation module is configured to compute a power of the noise vector to estimate the noise power.

A signal-to-noise ratio (SNR) computation module 670 is provided to divide the estimated signal power by the estimated noise power to generate the estimated SNR.

Further shown in the receiver 600 are an antenna 605 coupled to a receive (RX) front end 610. The RX front end may include, e.g., circuitry for converting a radio-frequency (RF) signal to a baseband digital signal for further processing. Also shown is an RX signal path 680 for digitally processing the baseband digital signal. The RX signal path 680 may perform such digital operations as equalization, decoding, etc., any of which may require signal power and/or noise power and/or SNR estimates generated by the signal and/or noise estimation block 630 as input parameters. The RX signal path 680 outputs RX data 680a for further processing, e.g., by a microprocessor (not shown).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. A method for estimating the characteristics of a signal received over a communications channel, the method comprising:
   generating an eigenvector basis for an autocorrelation matrix of a channel response vector;
   projecting the received signal onto a signal basis to generate a signal vector, the signal basis comprising at least one dominant eigenvector selected from the eigenvector basis;
   computing an energy of the signal vector to estimate the signal power;
   projecting the received signal onto a noise basis to generate a noise vector, the noise basis comprising at least one non-dominant eigenvector selected from the eigenvector basis, wherein the noise basis comprising a matrix comprising at least one non-dominant eigenvector selected from the eigenvector basis multiplied by a transmit pilot matrix; and
   computing an energy of the noise vector to estimate the noise power.

2. A method for estimating the characteristics of a signal received over a communications channel, the method comprising:
   generating an eigenvector basis for an autocorrelation matrix of a channel response vector;
   projecting the received signal onto a signal basis to generate a signal vector, the signal basis comprising at least one dominant eigenvector selected from the eigenvector basis;
   computing an energy of the signal vector to estimate the signal power;
   projecting the received signal onto a noise basis to generate a noise vector, the noise basis comprising at least one non-dominant eigenvector selected from the eigenvector basis; and
   computing an energy of the noise vector to estimate the noise power, wherein the computing the energy of the noise vector comprising taking the inner product of the noise vector, and dividing the inner product by the number of selected non-dominant eigenvectors.

3. An apparatus for estimating the characteristics of a signal received over a communication channel, the apparatus comprising:
   a memory storing a signal basis comprising at least one dominant eigenvector selected from an eigenvector basis for an autocorrelation matrix of a channel response vector, wherein the memory further stores a noise basis, the noise basis comprising at least one non-dominant eigenvector from the eigenvector basis, the at least one non-dominant eigenvector comprising all eigenvectors that are not dominant;
   a projecting module configured to project the received signal onto the signal basis to generate a signal vector, wherein the projecting module is configured to project the received signal onto the noise basis to generate a noise vector;
   an energy computation module configured to compute an energy level of the signal vector to estimate the signal power; and
   a noise computation module configured to compute an energy of the noise vector to estimate the noise power.

4. An apparatus for estimating the characteristics of a signal received over a communication channel, the apparatus comprising:
   a memory storing a signal basis comprising at least one dominant eigenvector selected from an eigenvector basis for an autocorrelation matrix of a channel response vector, wherein the memory further stores a noise basis, the noise basis comprising at least one non-dominant eigenvector from the eigenvector basis;
   a projecting module configured to project the received signal onto the signal basis to generate a signal vector, wherein the projecting module is configured to project the received signal onto the noise basis to generate a noise vector;
   an energy computation module configured to compute an energy level of the signal vector to estimate the signal power; and
   a noise computation module configured to compute an energy of the noise vector to estimate the noise power, wherein the noise computation module configured to take the inner product of the noise vector, and dividing the inner product by the number of selected non-dominant eigenvectors.

5. An apparatus for estimating the characteristics of a signal received over a communications channel, the apparatus comprising:
   means for generating an eigenvector basis for an autocorrelation matrix of a channel response vector;
   means for projecting the received signal onto a signal basis to generate a signal vector, the signal basis comprising at least one dominant eigenvector selected from the eigenvector basis
   means for computing an energy of the signal vector to estimate the signal power;
   means for projecting the received signal onto the noise basis to generate a noise vector, the noise basis comprising at least one non-dominant eigenvector selected from the eigenvector basis, wherein the noise basis comprising a matrix comprising at least one non-dominant eigenvector selected from the eigenvector basis multiplied by a transmit pilot matrix; and
   means for computing an energy of the noise vector to estimate the noise power.

6. A non-transitory computer-readable medium storing code for causing a computer to estimate the characteristics of a signal received over a communications channel, the code comprising:
   code for causing a computer to generate a generate an eigenvector basis for an autocorrelation matrix of a channel response vector;
   code for causing a computer to project the received signal onto the signal basis to generate a signal vector, the signal basis comprising at least one dominant eigenvector selected from the eigenvector basis;

code for causing a computer to compute an energy of the signal vector to estimate the signal power;

code for causing a computer to project the received signal onto a noise basis to generate a noise vector, the noise basis comprising at least one non-dominant eigenvector selected from the eigenvector basis, wherein the noise basis comprising a matrix comprising at least one non-dominant eigenvector selected from the eigenvector basis multiplied by a transmit pilot matrix; and code for causing a computer to computer an energy of the noise vector to estimate the noise power.

* * * * *